United States Patent [19]
Petrick

[11] Patent Number: 4,648,026
[45] Date of Patent: Mar. 3, 1987

[54] MICROPROCESSOR STEPPER MOTOR DRIVE

[75] Inventor: Bruce E. Petrick, Lake Oswego, Oreg.

[73] Assignee: Tektronix, Inc., Beaverton, Oreg.

[21] Appl. No.: 684,317

[22] Filed: Dec. 20, 1984

[51] Int. Cl.⁴ .................. G06F 15/20; H02K 29/04
[52] U.S. Cl. ............................... 364/174; 318/685; 318/696; 364/400
[58] Field of Search ............... 364/130, 167, 174, 400; 318/685, 696

[56] References Cited

U.S. PATENT DOCUMENTS

| | | | |
|---|---|---|---|
| 4,156,170 | 5/1979 | Strunc | 318/696 |
| 4,215,302 | 7/1980 | Chiang | 318/696 |
| 4,438,380 | 3/1984 | Kaseta | 318/685 X |
| 4,469,995 | 9/1984 | Chiang et al. | 318/685 |
| 4,469,996 | 9/1984 | Oltendorf | 318/696 |
| 4,477,757 | 10/1984 | Palombo et al. | 318/696 |
| 4,489,259 | 12/1984 | White et al. | 318/696 |
| 4,511,832 | 4/1985 | Schmitz | 318/696 X |

*Primary Examiner*—Joseph Ruggiero
*Attorney, Agent, or Firm*—Francis I. Gray; Paul S. Angello; Robert S. Hulse

[57] ABSTRACT

A microprocessor stepper motor drive uses a single acceleration/deceleration profile regardless of the final velocity of the device being driven. A first down counter stores the desired final velocity from a microprocessor. An acceleration/deceleration profile is stored in a storage device and added to the desired final velocity to produce a smooth velocity profile.

7 Claims, 6 Drawing Figures

MICROPROCESSOR STEPPER MOTOR DRIVE

BACKGROUND OF THE INVENTION

The present invention relates to stepper motor drives, and more particularly to a microprocessor stepper motor drive which is digitally controlled.

Stepper motors have been employed in the driving portion of equipment such as X-Y plotters and printers. The movable object of such equipment needs to be accelerated to a selected velocity, and then decelerated. The acceleration/deceleration profiles are either linear or nonlinear. Linear profiles, as shown in FIG. 1a, result in ringing at the inflection points of the profile. Nonlinear profiles which are optimized for a maximum velocity are truncated for lower velocities as shown in FIG. 1b, again resulting in ringing. To make nonlinear profiles suitable for several selected velocities, a plurality of profiles, one for each velocity, have been stored in a plurality of look-up tables, using excessive memory.

What is desired for a massive moving object, such as a drum on a digitizing device, is a velocity profile having a slow start, a fast rise, and then a smooth inflection to the operating velocity, which profile is the same for every final velocity desired without the need for a plurality of profile tables for each selected final velocity.

SUMMARY OF THE INVENTION

Accordingly, the present invention provides a microprocessor stepper motor drive which uses a single acceleration/deceleration profile regardless of the final velocity of the device being driven. A first down counter stores the desired final velocity from a microprocessor. An acceleration/deceleration profile is stored in a storage device and added to the desired final velocity to produce a smooth velocity profile.

Thus, it is an object of the present invention to provide a microprocessor stepper motor drive having a velocity profile with a drive having a smooth, nonlinear acceleration/deceleration portion regardless of the selected final velocity.

Other objects, advantages and novel features will be apparent from the following detailed description when read in conjunction with the appended claims and attached drawings.

DESCRIPTION OF THE PREFERRED EMBODIMENT

Figure 1A:
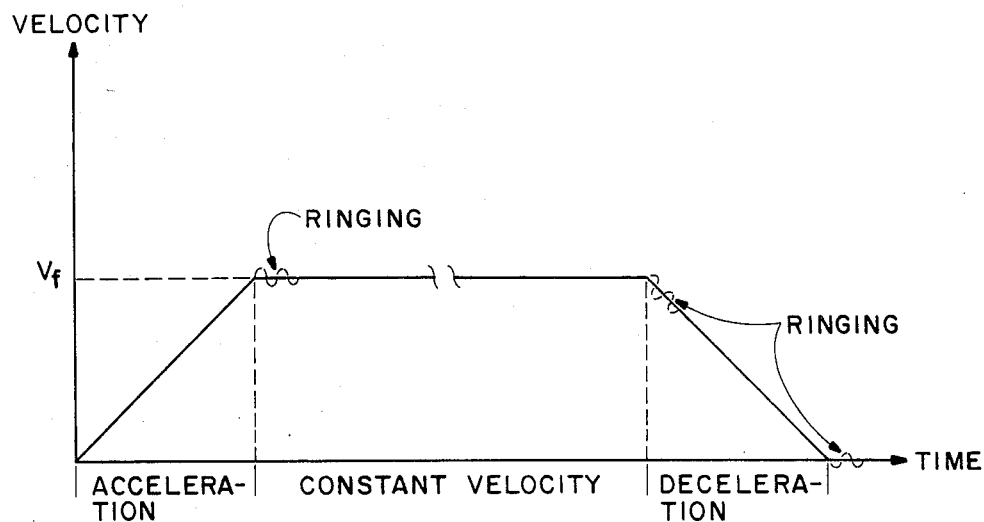
FIG. 1a and FIG. 1b are graphic views of prior art velocity profiles for stepper motors.
Figure 1B:
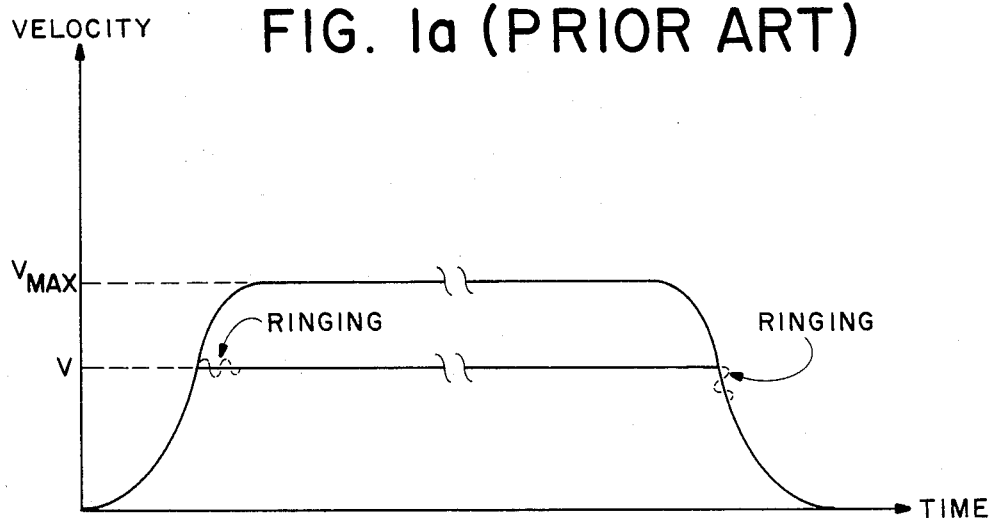
Figure 2:
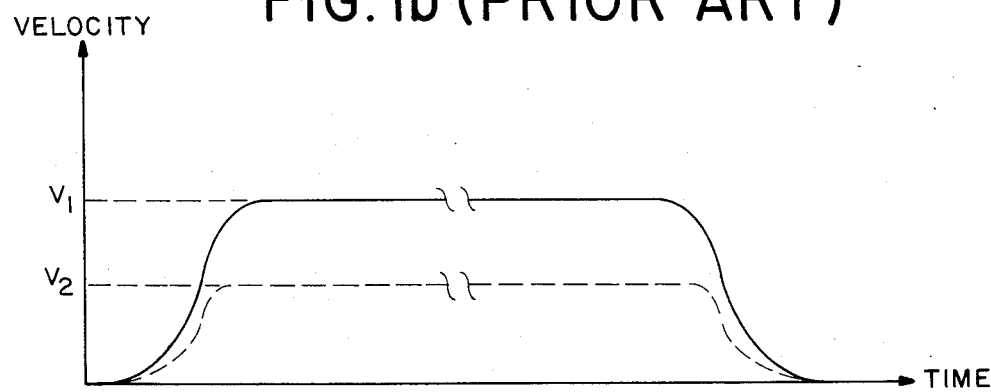
FIG. 2 is a graphic view of the velocity profile for a microprocessor controlled stepper motor according to the present invention.

Referring now to FIG. 2 a desired velocity profile for a stepper motor is shown. The initial acceleration is slow, then increases to a constant rate, and then decreases to zero as the velocity approaches the desired velocity, $V_1$ or $V_2$ being representative final velocities. The profile shape may be a half-cosine wave, for example. As is shown, regardless of the final velocity, the acceleration/deceleration profile shape is the same without truncation. This is achieved by summing the acceleration/deceleration profile with the final velocity. In actuality what is used is the time between steps of the stepper motor. For acceleration the initial time values for the acceleration/deceleration profile (profile time values) are much greater than the time value for the final velocity, and decrease to zero when the final velocity is achieved. For deceleration the profile time values are added in reverse order so that the time between steps increases to become so large as to effectively stop the device being driven.

Figure 3:
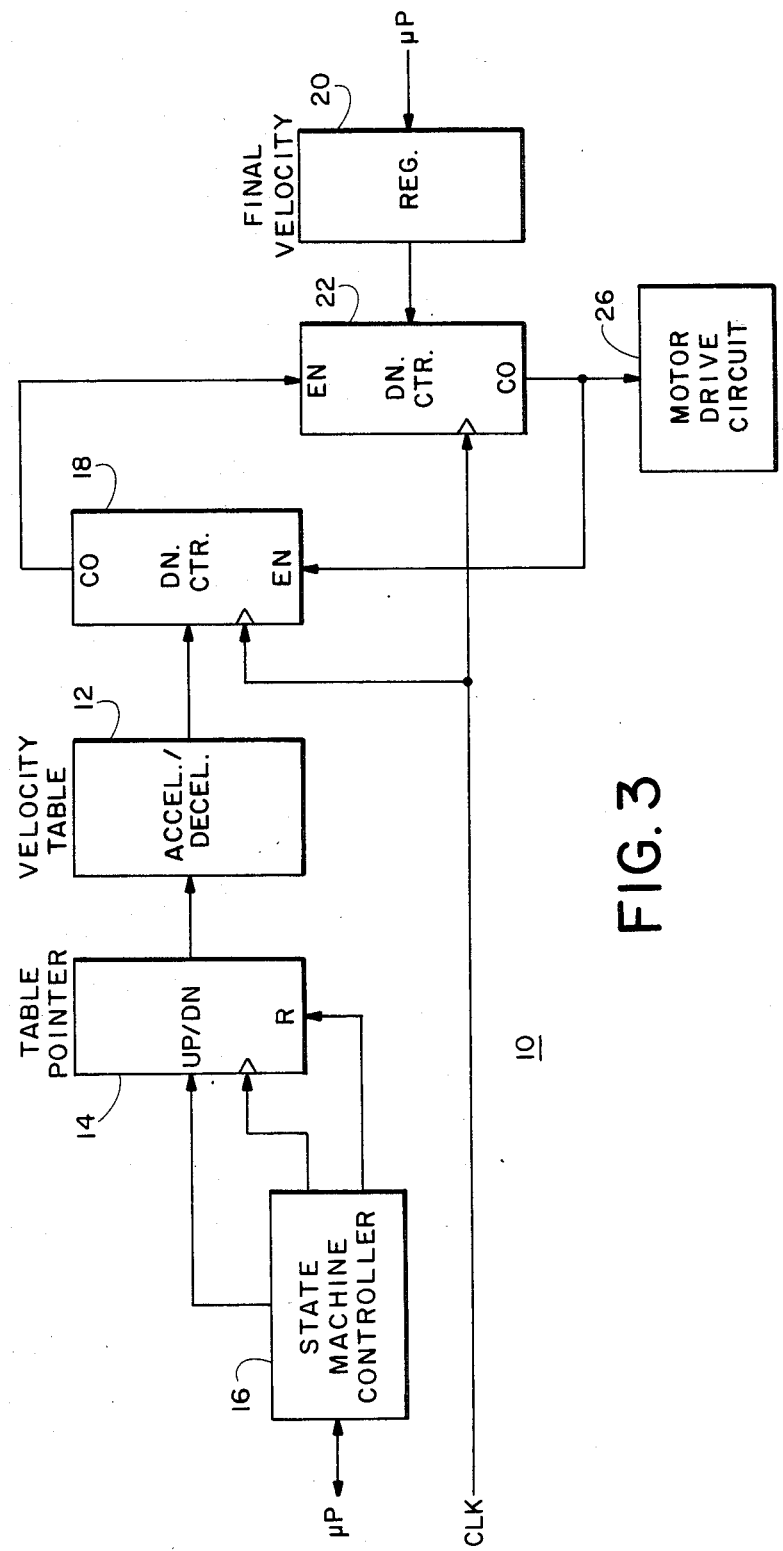
FIG. 3 is a block diagram view of a microprocessor stepper motor drive according to the present invention.
Figure 4:
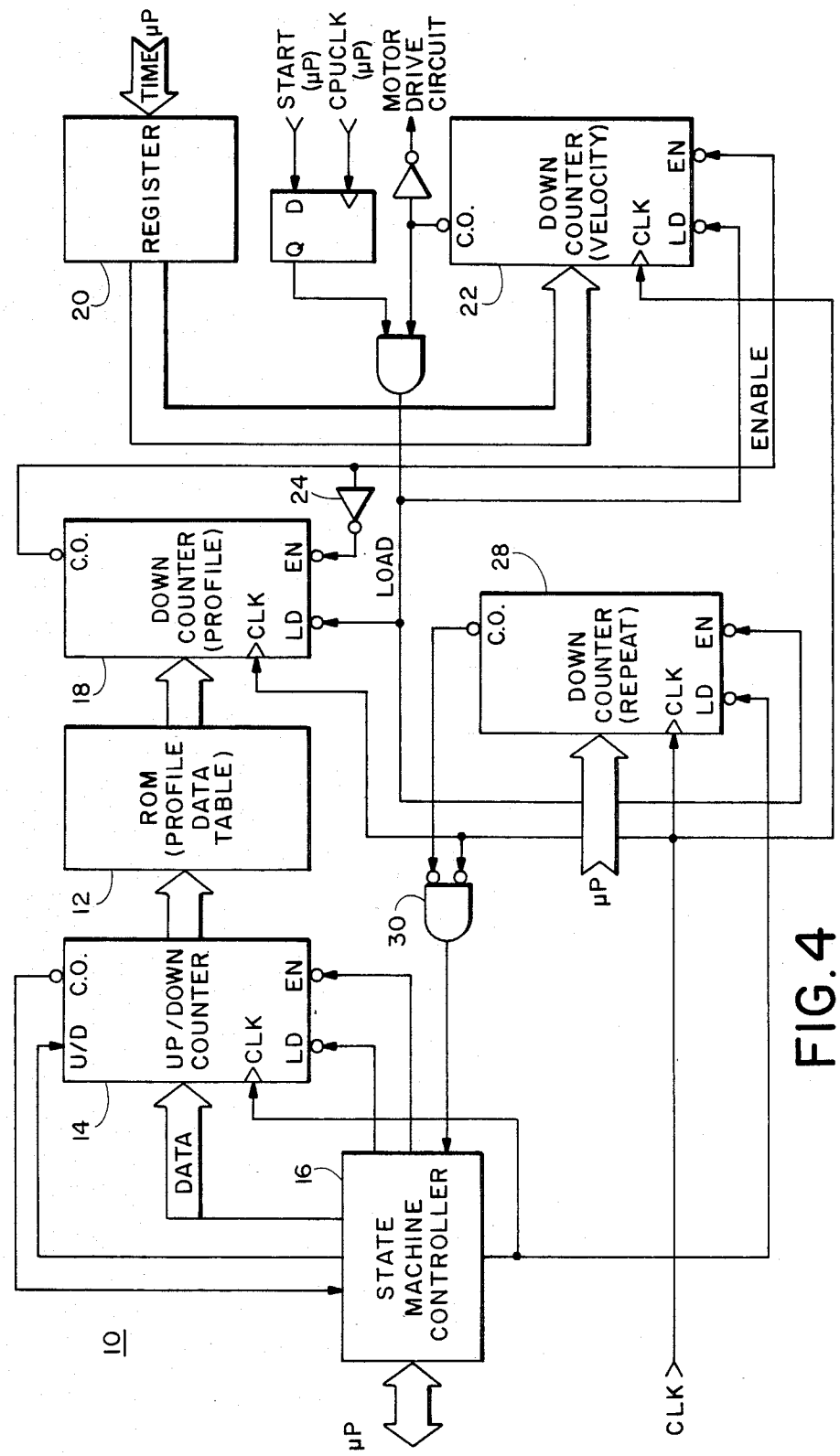
FIG. 4 is a schematic view of a microprocessor stepper motor drive according to the present invention.

A microprocessor stepper motor drive 10 is shown in FIGS. 3 and 4. A velocity profile table, or ROM, 12 stores a profile table which is a plurality of time value points making up the acceleration/deceleration profile. A table pointer 14, which receives commands from a state machine controller 16, is an UP/DOWN counter and addresses the ROM 12 to determine the profile time value point to be used at any particular instant. The profile time value point from the ROM 12 is transferred to a DOWN counter 18.

The time between steps for the desired final velocity is stored in a register 20 from a microprocesor. This final velocity value is then transferred from the register 20 to a second DOWN counter 22. A clock signal CLK causes the two DOWN counters 18,22 to count down in sequence. An inverter 24 acts as a switch to enable the DOWN counters 18,22 one at a time. The carryover signal from the profile DOWN counter 18 via the inverter 24 enables the profile DOWN counter while disabling the velocity DOWN counter 22. When the profile DOWN counter 18 reaches zero, the carryover signal changes state, disabling the profile DOWN counter via the inverter 24 and enabling the velocity DOWN counter 22. When the velocity DOWN counter 22 reaches zero, the carryover signal switches state and provides an output to a motor drive circuit 26 to move the motor one step. The carryover signal from the velocity DOWN counter 22 also provides a LOAD signal to reload the velocity time value from the register 20 to the velocity DOWN counter and to load the next profile time value point from the ROM 12 to the profile DOWN counter 18.

The state machine controller 16 receives commands from the microprocessor, such as START motor or STOP motor, and transmits status messages to the microprocessor, such as device MOVING and CONSTANT VELOCITY. The START/STOP command causes the state machine controller 16 to load the UP/DOWN counter 14 with all "1"s or all "0"s, depending upon whether the counter is to count down or count up, or if a constant velocity signal, either zero or the final velocity, is present. A clock signal from the state machine controller 16 is generated when the velocity DOWN counter 22 reaches zero. The UP/DOWN counter 14 is incremented/decremented to address a new profile time value point in the ROM 12, which point is in turn loaded into the profile DOWN counter 18. When all entries of the profile table in the ROM 12 have been addressed, the carryover output from the UP/DOWN counter 14 signals the state machine controller 16 that a constant velocity, either zero or the final velocity, has been attained.

An optional third DOWN counter 28, shown in FIG. 4, is provided to control the acceleration/deceleration time. The CLK signal is AND'd with the carryover signal from the repeat DOWN counter 28 by a gate 30 to signal the state machine controller 16 to increment/decrement the UP/DOWN counter 14. The same clock signal from the state machine controller 16 which increments/decrements the UP/DOWN counter 14 also loads the repeat value into the repeat DOWN counter 28. The repeat DOWN counter 28 is counted down by the CLK signal each time it is enabled by a LOAD signal, i.e., each time the velocity DOWN counter 22 reaches zero. The result is that the same profile time value point is loaded from the ROM 12 into the profile DOWN counter 18, since the address of the UP/DOWN counter 14 does not change until the repeat DOWN counter 28 reaches zero. This lengthens the acceleration/deceleration time.

Figure 5:
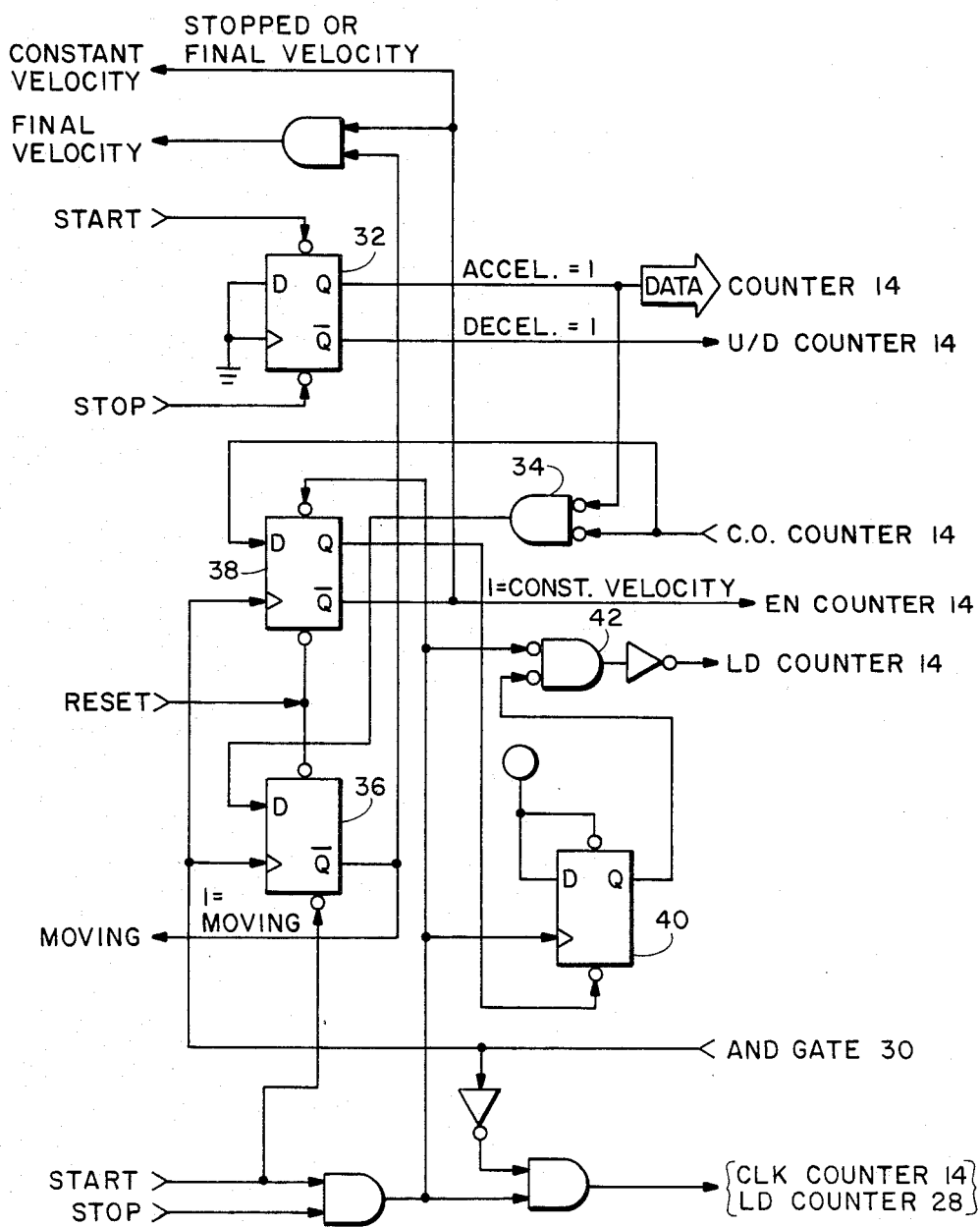
FIG. 5 is a schematic view of a state machine controller for the microprocessor stepper motor drive of FIG. 4.

The state machine controller 16 is shown in greater detail in FIG. 5. A first flip-flop 32 is configured as a bi-stable flip-flop. A START command sets the Q output of the first flip-flop 32 to high, loading 1's into the UP/DOWN counter 14 and inhibiting gate 34. The Q output of flip-flop 32 tells the UP/DOWN counter 14 to count DOWN. A second flip-flop 36 sets its Q output high upon receipt of the START signal to indicate the device is moving. The output of gate 34 applied to the D input of flip-flop 36 inhibits the flip-flop from changing state as long as the device is moving. A third flip-flop 38 has its D input connected to the carryover from UP/DOWN counter 14. While the UP/DOWN counter 14 is counting, the Q output of flip-flop 38 is high. When the count is complete, i.e., the device is stopped or at its final velocity, the Q output of the flip-flop 38 goes high to indicate a constant velocity is achieved. The Q output of flip-flop 38 is applied to trigger a fourth flip-flop 40 which enables a gate 42. The gate 42 causes the UP/DOWN counter 14 to load the appropriate value from flip-flop 32 when a START or STOP signal is applied to the input of the gate.

Thus, the present invention provides a microprocessor stepper motor drive which adds a single acceleration/deceleration profile to any selected final velocity to produce a smooth velocity profile without truncation and/or ringing.

What is claim is:

1. A microprocessor stepper motor drive, comprising:
    means for storing a single, predetermined acceleration/deceleration profile having a plurality of points; and
    means for adding said acceleration/deceleration profile to a selected final velocity such that a total velocity profile is produced having a smooth, non-linear acceleration/deceleration portion.

2. A microprocessor stepper motor drive as recited in claim 1 further comprising means for increasing the duration of said acceleration/deceleration portion.

3. A microprocessor stepper motor drive as recited in claim 2 wherein said increasing means and said adding means cooperate to add a repeat value to each of said points and thereby increase the duration of said acceleration/deceleration portion.

4. A microprocessor stepper motor drive as recited in claim 1 wherein said adding means comprises:
    means for accessing each of said points in said storing means sequentially and transferring said point so accessed to a first counter;
    means for transferring said selected final velocity to a second counter; and
    means for decrementing each of said counters in sequence such that when said second counter reaches zero said accessing means transfers another one of said points to said first counter and said transferring means transfers said selected final velocity to said second counter;
    whereby when all of said points have been accessed a constant velocity is achieved selected from the group consisting of zero and said selected final velocity.

5. A microprocessor stepper motor drive as recited in claim 1 wherein said adding means comprises:
    means for accessing each of said points in said storing means sequentially and transferring said point so accessed to a first counter;
    means for transferring said selected final velocity to a second counter; and
    means for clocking each of said counters in sequence such that whenever said first counter receives a first number of clock pulses that corresponds to said point and said second counter receives a second number of clock pulses that corresponds to said selected final velocity, said accessing means transfers another one of said points to said first counter and said transferring means transfers said selected final velocity to said second counter;
    whereby when all of said points have been accessed a constant velocity is achieved selected from the group consisting essentially of zero and said selected final velocity.

6. A microprocessor stepper motor drive, comprising:
    means for storing a predetermined acceleration/deceleration profile having a plurality of points;
    means for adding said acceleration/deceleration profile to a selected final velocity;
    means for accessing each of said points in said storing means sequentially and transferring said point so accessed to a first counter;
    means for transferring said selected final velocity to a second counter; and
    means for clocking each of said counters in sequence such that whenever said first counter receives a first number of clock pulses that corresponds to said point and said second counter receives a second number of clock pulses that corresponds to said selected final velocity, said accessing means transfers another one of said points to said first counter and said transferring means transfers said selected final velocity to said second counter,
    thereby to provide, when all of said points have been accessed, a velocity profile having a substantially oscillation-free transition between said acceleration/deceleration profile and said selected final velocity.

7. A microprocessor stepper motor drive as recited in claim 6 wherein said clocking means decrements said first counter by said first number of clock pulses and decrements said second counter by said second number of clock pulses.

* * * * *